March 26, 1968  W. W. WARD  3,375,053
COMBINATION PLANE AND SPHERICAL REARVIEW TRUCK MIRROR
Filed June 29, 1964  2 Sheets-Sheet 1

INVENTOR.
WALLACE W. WARD
BY Harry Price
ATTORNEY

March 26, 1968 W. W. WARD 3,375,053
COMBINATION PLANE AND SPHERICAL REARVIEW TRUCK MIRROR
Filed June 29, 1964 2 Sheets-Sheet 2
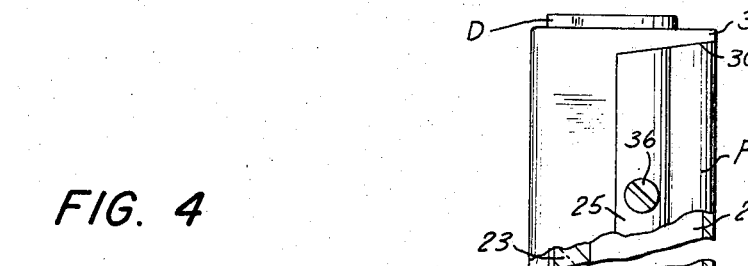
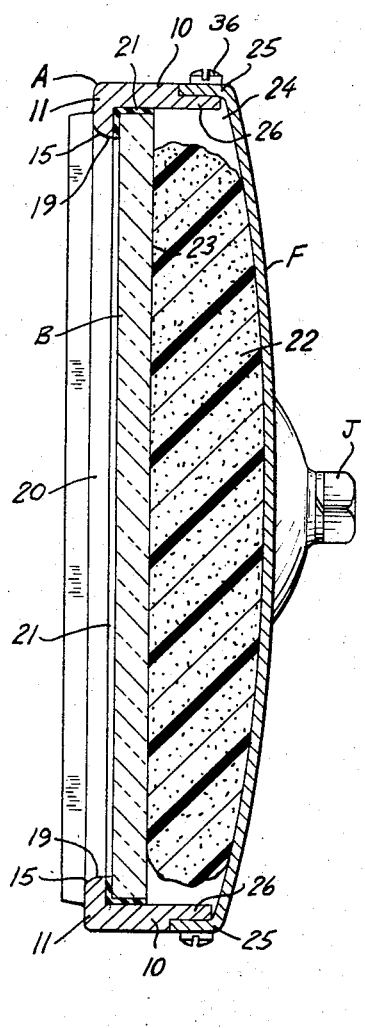
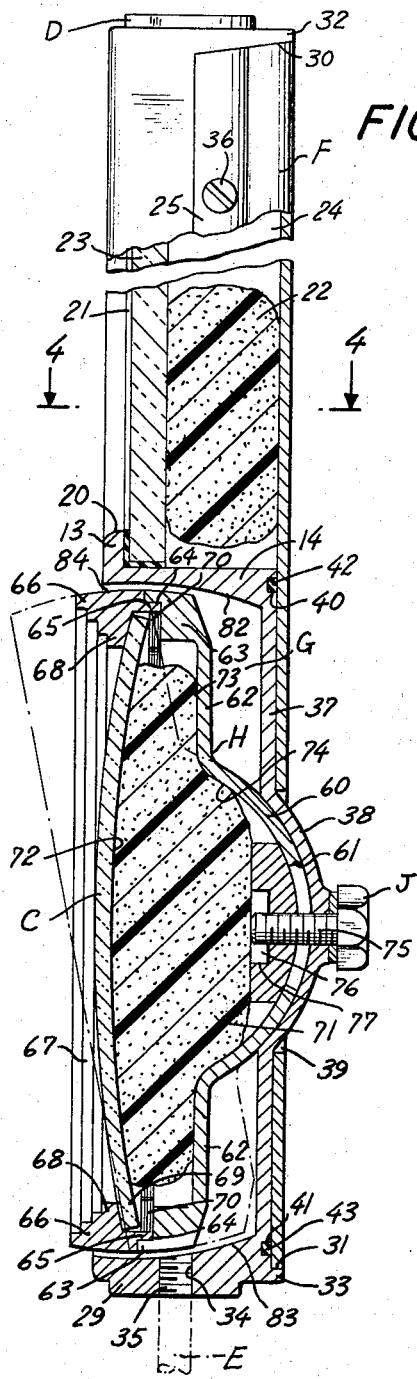
INVENTOR
WALLACE W. WARD
BY Harry Price
ATTORNEY

United States Patent Office 3,375,053
Patented Mar. 26, 1968

3,375,053
COMBINATION PLANE AND SPHERICAL REARVIEW TRUCK MIRROR
Wallace W. Ward, Chatham Township, Morris County, N.J., assignor to Diecasters, Inc., Closter, N.J., a corporation of New Jersey
Filed June 29, 1964, Ser. No. 378,525
1 Claim. (Cl. 350—293)

ABSTRACT OF THE DISCLOSURE

The present disclosure sets forth a truck mirror comprising an upper flat mirror and a lower spherical mirror received in substantially the same casing, with the plane of the upper mirror substantially constituting the tangent front plane of the lower mirror and with the lower mirror being pivotally mounted by means of ball adjustments in the rear of the casing.

---

Figure 1:
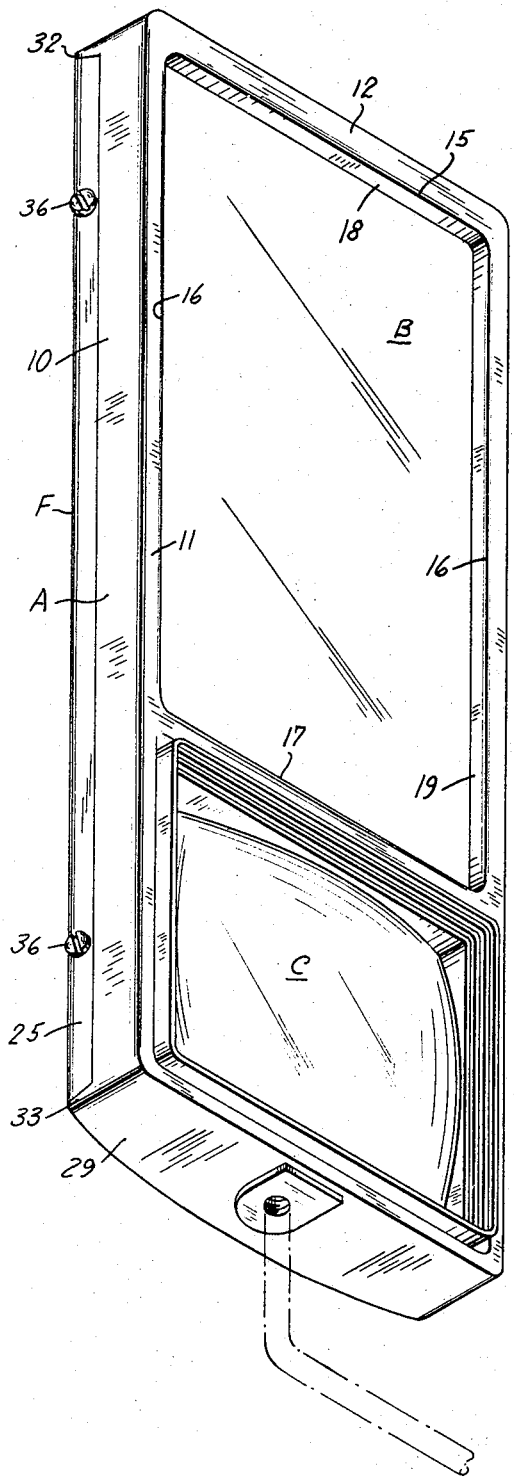

The present invention relates to a track rearview mirror and it particularly relates to a truck view mirror which may be properly mounted upon a truck to give proper view toward the rear and side of the vehicle.

The primary object of the present invention is to provide a novel rearview mirror for a truck which will supply the truck driver with aggregate views rearwardly and laterally of his vehicle to be able more accurately to determine the direction and speed of approach of adjacent vehicles and enhance safety in driving.

Another object is to provide a novel rearview truck mirror which will permit better determination of both perspective and proximity of adjacent objects and vehicles and will permit the truck driver to control the spacing of his vehicle in respect to adjacent objects whether moving or straight both in driving and parking.

Another object is to provide a truck mirror which while aesthetically compatible with the vehicle will, nevertheless, permit a better determination by the truck driver of the likelihood of closer approach of other vehicles and stationary objects and will permit better control in respect to the road and lanes therein both in forward and reverse movement of the vehicle as well as being economically feasible for mass production.

A further object is to provide a novel truck mirror which will enable a rapid visible determination of adjacent objects whether moving or stationary without distortion in perspective and loss of proximity sense on the part of the driver of the vehicle.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a truck mirror which will be of generally rectangular shape having a relatively elongated top rectangular portion and a lower shorter and squarer bottom adjustable spherical portion.

Although not limited thereto, it has been found, that for most trucks, an approximate width of 5 to 10 inches with an optimum of about 6 to 7 inches and a maximum height of about 12 to 20 inches is most satisfactory.

In this height proportion about one-third of the total height adjacent the bottom may be taken up by the curved or spherical mirror while the upper two-thirds or three-fourths may be taken up by the plane or flat rearview mirror.

Generally, the frame will enclose both the upper and lower mirror and will hold such mirror upon a foam support whether of a polyurethane or polyethylene resinous material.

Desirably, the front frame has a lower recess for receiving the adjustable spherical mirror which may be pivotally mounted for adjustment purposes and has a top rear opening frame for insertion of the flat mirror with both upper and lower mirrors being resiliently mounted and pressed forward.

This foam may be formed in situ or inserted so as to substantially fill the space between the backing plate and the mirror in connection with the flat mirror as well as with the spherical mirror.

The housing itself may be made of a die casting with a rear attachment plate desirably curved and having adequate seals so as to seal the foam resinous filler material whether of polyurethane or polyester material in position.

Both mirrors are desirably held at their periphery by means of gasket at their edges of their frame so as to prevent entry of moisture or foreign material, and the body of the mirrors themselves may be readily replaceable by removing the rear structures which press the gasket and mirror against the inturned members of the frame.

It has been found most satisfactory according to one embodiment of the present invention that both the plane and convex sections of the mirrors be superimposed so that the convex section is below and so that the flat or planar mirror occupies from one-half to three-fourths of the entire mirror surface.

Desirably, both mirrors have the same lateral width with the height of the convex mirror being about one-half to two-thirds that of the planar mirror.

In a preferred embodiment, the front surface of the curved mirror is tangent to the front plane of the front mirror except when in normal central position and even when adjustment is made, the center of the lower mirror will be vertically aligned with the center of the upper mirror and with the central portion in the same vertical plane or tangent to the plane of the upper plane or mirror.

Generally, the spherical mirror may have a curvature on a radius of not less than 8 inches and not more than 15 inches with a preferred radius of 10 to 12 inches.

The most satisfactory curvature is about 10 inches plus or minus 2 inches.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

Figure 2:
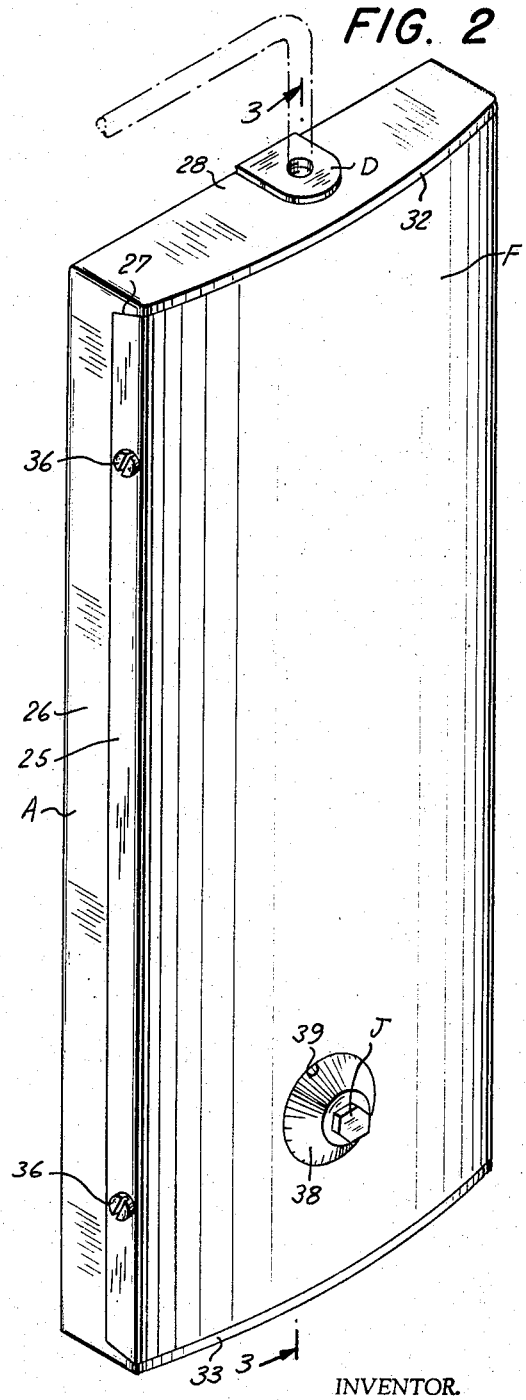

In the drawings wherein like reference characters denote corresponding parts throughout the several views:
FIG. 1 is a front perspective view.
FIG. 2 is a rear perspective view.
FIG. 3 is a transverse vertical sectional view upon the line 3—3 of FIG. 2.
FIG. 4 is a transverse horizontal sectional view upon the line 4—4 of FIG. 3.

Referring to FIGS. 1 to 4, there is shown a main enclosure or frame A receiving an upper flat planar mirror B and a lower convex or spherical mirror C with top and bottom mountings D and E for the frame A upon the truck.

A removable backing plate F may be provided for the entire structure, and in the lower recess G for the spherical convex mirror, there will be provided an adjustable backing structure H pivotally mounted at J so as to permit adjustment.

The frame A may be of die cast material or if desired of a strong moisture and oil resistant plastic, such as high impact styrene Delrin which is an acetyl resin put out by Du Pont derived by polymerization of formaldehyde.

In the preferred frame structure, as is best shown in section in FIGS. 3 and 4, the frame has the side members 10 with the forwardly extending inturned front flanges 11 and the top inwardly direction flange 12.

Adjacent the planar mirror, there is also an inturned flange 13 carried by the interior wall structure 14.

The edges of the flanges 11, 12 and 13 are provided with a radius 15, 16 and 17 which turns into the flat edges 18, 19 and 20 which forms the inside of the frame of the planar mirror B.

The planar mirror B fits directly inside of the inturned flanges 11, 12 and 13 and is pressed against a gasket 21 which extends along the sides and upper and lower edges thereof inside of the flange 19.

The mirror is held in position by means of the polyurethane or polyester foam 22 which may be formed in position or forced into place either to cover substantially the entire rear face 23 of the mirror or a substantial area thereof.

The foam may also be arranged in clumps if desired, but it should be firmly compressed in position against the rear face 23.

The enclosure or open space 24 in back of the planar mirror B is closed off by the rear closure plate F which as shown has a slight cylindrical curvature with inturned flanges 25 which fit in the recess 26 of the sides 10 of the frame.

At the upper and lower ends of the frame structure A as is best shown in FIG. 2, the flanges 26 terminate at 27 short of the top and bottom 28 and 29 of the frame structure A.

The edges 30 and 31 of the curved backing plate fit inside of the ledges 32 and 33 of the frame structure A, and desirably are substantially flush therewith so as to form a smooth back finish.

The frame structure itself has the lower wall structure 29 which extends the full depth of the frame and receives a tapped opening 34 receiving the threaded end 35 of the truck mounting rod E.

The sides 25 of the cover F are held in position by means of the screws 36.

The lower portion 37 of the frame between the walls 14 and 29 may be curved to closely conform to the curved back portion of the cover F, and it has a projecting dome or spherical portion 38 which projects through the opening 39 in the cover F to form part of the pivot mounting arrangement for the lower curved or convex mirror C.

The rear of the frame A at the back of the walls 14 and 29 is desirably projected with a recess 40 and 41 which receive the sealing rings 42 and 43 which may extend peripherally around the dome portion 38 to assure a seal around the lower adjustable spherical mirror structure C.

The lower frame H which may be adjusted within the open space G has a curved or spherical rear portion 60 having an opening 61 adjacent the center of the pivotal portion, and it has the outwardly extending flat portions 62 and the flange edge 63.

This flange edge 63 has a recess 64 in which is press fitted the extension 65 of the front frame members 66 having the stepped interior face 67.

The stopped interior face 67 terminates in the flange 68 which presses against the periphery 69 of the convex or spherical mirror C and presses against the gasket 70 which presses between the structure 63 and 68 of the backing H and the outside frame 66 of the adjustable mirror C.

The foam material 71 will be compressed between the inside face 72 of the curved mirror C and the inside faces 73 and 74 of the back structure H for the spherical mirror C.

The bolt 75 will have a hexagonal head 76 fitting into the recess 77 in the plug member 78 which is compressed against the inside face 79 around the periphery of the opening 61.

The bolt will extend through the opening 61, and the dome 38, and its end will be held by the nut 80 with the intermediate gasket 81 clamped in position.

The foam material 71 will either be formed in situ or may be added when the spherical mirror is assembled.

The cap nut 81 may be loosened or tightened to permit adjustment and clamping of the spherical convex mirror in any desired adjusted position, and the space G is sufficient to permit a substantial adjustment over an angle of 5 to 15 degrees along any axis.

It will be noted that along the interior faces of the walls 14 and 29 are spherical contours as indicated at 82 and 83 so as to accommodate the curved edges or outside face 84 of the backing plate 62.

The double mirror construction B–C, as indicated in FIGS. 1 to 4, will give complete near and far view to the driver, will enable better and more ready adjustment, will enable better steering and adjustment, and more ready and quicker response of the driver to approaching or parallel vehicles or even to pedestrians or other objects.

The top plane mirror will give a more limited view, whereas the lower curved or convex mirror will give a much wider view.

The will enable a better determination of the location of near and far objects so that the driver may exercise maximum precaution in case of any collision course in respect to either a moving person, moving vehicle or moving object.

The planar or flat mirror should desirably always occupy at least 50% of the available area, and although other arrangements may be used, desirably the plane or flat mirror is above and the curved mirror is below.

The element C which is shown as having a slight conical contour may be made cylindrical with a plurality of serrations around the periphery thereof for better gripping purposes.

The plastic gaskets 21 and 70 may be made of any plastic material or fiber or rubber, but is desirably of polyethylene material.

The metal parts of the mirror are of chrome-plated zinc, brass or anodized metal.

Although the upper and lower mirrors are shown so that they are substantialy in the same vertical plane, they may also be offset with the curved lower mirror being slightly to the rear of the upper mirror or with the curved lower mirror being narrower than the flat upper mirror.

The axes of the upper and lower mirror may vary from being parallel to being divergent or convergent forwardly at an angle of about 10 degrees.

Desirably, the two mirrors should be so adjusted in respect to their convergent axes and in respect to their curvature so that one observing the mirror will be able to quickly determine the relative velocity of any sidewardly or rearwardly approaching or moving object by the relative rate of change of the size of the images in the mirrors.

By changing the convergence of the axes of the mirrors B and C, this can be regulated to suit the observing power of a particular driver.

Normally, the relative motion of the respective mirror images will differ, the slower moving image being from the curved mirror and the relationship between these movements will be in enhanced safety factor.

Generally, the overall size should be between 4" x 12" although it may extend up to 10" x 24".

On the other hand, the maximum height might range from 12 inches or up to 20 inches.

The curvature of the spherical mirror should range from 8 to 15 inch radius.

Preferably the truck mirror of the present invention has a substantially vertical frame with a ratio of height to width of 3:1 actually 16"/6" to conform with the general size and proportions of presently supplied truck mirrors of the so-called "West Coast" type.

The frame as shown is desirably divided into two horizontal compartments the upper of which is twice the height of the lower and this division is accomplished in the preferred embodiment by a horizontal bar extending the full width of said frame—wherein said upper frame compartment is designed to hold a flat plane mirror of substantially 6" x 10".

Thus ⅔ of the vertical height of the frame carries the plane mirror and the lower compartment or lower third will support or carry a spherically curved mirror substantially rectangular in shape or constituting a rectangular sector of sphere.

The spherical mirror in the preferred form as shown is mounted in its own separate frame and housing, said housing being designed to have a pivotal mount at a point substantially in the center of the lower frame compartment. This mounting will provide for the swiveling of said curved mirror with respect to tthe main frame, said swiveling to subtend to an angle of 10° to 15° in either direction on the horizontal axis and at an angle of 10° to 15° in either direction on the vertical axis together with such rotation in the direction spherically disposed to the principal axes as is permitted by the rectangular frame.

As many changes could be made in the above truck rearview mirror and many widely different embodiments of this invention could be made without departing from the scope of the claim, it is intended that all matter contained in the above description shall be interpreted as illustrative and not in a limiting sense.

Now having particularly described and ascertained the nature of the invention, and in what manner the same is to be performed, what is claimed is:

1. A rearview combination upper flat and lower spherical truck mirror comprising a vertically elongated rectangular base frame constituting a back support with a cylindrically rounded rear wall and forwardly extending attachment side flanges along the sides thereof, a front frame member mounted in said base frame and on said side flanges, having an upper frame element occupying the major area of the mirror, a flat plane mirror mounted in said upper frame element, the lower part of said front frame member being recessed to form a bottom wall and a transverse horizontal separating wall extending between the sides of the base frame, an auxiliary frame mounted in said recess having a pivotal connection at the rear of the recess of the front frame member and a spherical mirror mounted in said auxiliary frame, the inside lower face of the horizontal separating wall and the inside top face of the bottom wall being concavely curved and the top and bottom walls of the auxiliary frame being convexly curved and said concave and convex curves being closely adjacent each other and conforming to each other upon pivotal movement of the auxiliary frame on said pivotal connection, the plane of the front of the flat mirror being tangent to the front of the spherical mirror and the spherical mirror being positioned so as not to project substantially forwardly of the plane of the flat mirror, said spherical mirror occupying a minor proportion of the area of the rear view mirror and said plane mirror occupying a major portion and compressed foam cushioning positioned to contact the central rear side of each mirror, said auxiliary frame and said front frame member having rearwardly extending interfitting spherically curved portions and said rectangularly shaped base frame having a recess receiving said curved portions and a bolt extending through and clamping together said spherically curved portions.

References Cited
UNITED STATES PATENTS 2,705,904   4/1955   Tagliaferri _____ 350—303
3,146,296   8/1964   Fischer _____ 350—307

JEWEL H. PEDERSEN, *Primary Examiner.*

WIILLIAM L. SIKES, *Assistant Examiner.*